(12) United States Patent
Doerr

(10) Patent No.: US 6,304,380 B1
(45) Date of Patent: Oct. 16, 2001

(54) REDUCING POLARIZATION DEPENDENCY OF OPTICAL APPARATUS

(75) Inventor: Christopher Richard Doerr, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/520,828

(22) Filed: Mar. 6, 2000

(51) Int. Cl.[7] .................................................. G02B 27/28
(52) U.S. Cl. ........................ 359/484; 359/495; 359/497; 359/900; 385/11
(58) Field of Search ................................. 359/484, 495, 359/497, 900; 385/11, 14

(56) References Cited

U.S. PATENT DOCUMENTS

| | | | |
|---|---|---|---|
| 5,388,001 | * 2/1995 | Okayama et al. | 385/4 |
| 5,481,402 | * 1/1996 | Cheng et al. | 359/496 |
| 5,638,473 | * 6/1997 | Byron | 385/37 |
| 5,708,734 | * 1/1998 | Van Der Tol | 385/11 |
| 5,809,184 | * 9/1998 | Doerr et al. | 385/11 |
| 5,864,421 | * 1/1999 | Suzuki et al. | 359/331 |
| 5,946,129 | * 8/1999 | Xu et al. | 385/122 |

FOREIGN PATENT DOCUMENTS

| | | |
|---|---|---|
| 0 482 461A1 | * 4/1992 | (EP) . |
| 8-5977 A | * 1/1996 | (JP) . |
| 8-184789 A | * 7/1996 | (JP) . |
| 9-146020 A | * 6/1997 | (JP) . |
| 11-271817 A | * 10/1999 | (JP) . |

OTHER PUBLICATIONS

M. Fukutoku, et al., "Wavelength–Division–Multiplexing Add/Drop Multiplexer Employing a Novel Polarisation Independent Acousto–Optic Tunable Filter", Electronics Letters, vol. 29, No. 10, pp. 905–907, May 1993.*

Norio Takato, et al., "Silica–Based Integrated Optic Mach–Zehnder Multi/Demultiplexer Family with Channel Spacing of 0.01–250 nm." IEEE J. Selected Areas in Comm., vol. 8, No. 6, pp. 1120–1127, Aug. 1990.*

Norio Takato, et al., "Silica–Based Single–Mode Waveguides on Silicon and their Application to Guided–Wave Optical Interferometers", J. Lightwave Technology, vol. 6, No. 6, pp. 1003–1010, Jun. 1988.*

* cited by examiner

Primary Examiner—Cassandra Spyrod
Assistant Examiner—John Juba
(74) Attorney, Agent, or Firm—Howard R. Popper

(57) ABSTRACT

Polarization dependencies exhibited by components of optical apparatus, such as equalizers having chromatically variable transmissivity, are reduced by splitting the incoming light stream to be equalized into two orthogonally polarized streams which are applied to opposite ends of the apparatus through polarization maintaining fibers oriented such that the light polarization is the same for both directions of transmission through the apparatus and is aligned with one of the eigenpolarizations of the chip on which the apparatus is implemented. In an illustrative embodiment of an equalizer, the incoming light stream entering one port of a circulator and emerging from a second port is applied to the splitter on its way to the equalizer while the light streams emerging from the equalizer, after being spectrally recombined, re-enter the second port of the circulator and emerge from its third port to the output thereby eliminating any polarization dependencies of the equalizer.

7 Claims, 3 Drawing Sheets

REDUCING POLARIZATION DEPENDENCY OF OPTICAL APPARATUS

RELATED APPLICATIONS

This invention is related to copending application Ser. No. 09/111,138 filed Jul. 7, 1998 entitled "Channel Power Equalizer for a Wavelength Division Multiplexed System".

This invention is related to copending application Ser. No. 09/490,610 filed Jan. 25, 2000 entitled "Compensated Cascaded Waveguides".

This invention is also related to copending application Ser. No. 09/542,426 filed Apr. 4, 2000 entitled "Phase Shifters With Reduced Thermal Crosstalk".

FIELD OF THE INVENTION

This invention relates to optical apparatus such as equalizers having chromatically variable transmissivity and, more particularly, to reducing the polarization dependency of such apparatus.

BACKGROUND OF THE PRIOR ART

A class of devices employing waveguide gratings interconnected by a waveguide lens and functioning as a dynamic optical wavelength power equalizer is described in C. R. Doerr, et al, "Dynamic wavelength equalizer in silica using the single-filtered-arm interferometer", IEEE Photon. Technol. Lett., vol. 11, pp. 581–583, 1999. Other examples include wavelength-selective cross connects and large-channel-count wavelength add-drop filters. The aforementioned article points out that a ripple-free spectrum can be achieved for a cascaded grating-lens-grating device by taking care not to under-sample the spectrum at the lens inlets to the star couplers. In previous designs, both the grating and lens inlet center-to-center spacings in the inner star couplers were dimensioned to minimize loss and achieve small size. Unfortunately, small size tends to produce significant mutual coupling among both the grating and lens inlets which results in a periodic phase distortion of the light when it reaches the grating arms. Likewise, the mutual coupling in the grating inlets results in a periodic phase distortion of the light when it reaches the lens arms, the periods being equal to the Brillouin zone widths. In addition to these effects, polarization-dependent loss (PDL) limits the usefulness of the equalizer, and for many applications the PDL must be <0.1 dB over the entire spectrum of interest and, even when good engineering practices are followed it is not unusual to have a PDL of more than 5 dB. Reducing polarization dependency in optical devices such as equalizers having chromatically variable transmissivity would yield a device that is more generally useful in wavelength-division multiplexed networks.

SUMMARY OF THE INVENTION

In accordance with the principles of our invention, in one aspect thereof, polarization dependency in optical apparatus, such as equalizers having chromatically variable transmissivity, is reduced by splitting the light incoming to the apparauts into orthogonally polarized streams and directing the streams to pass through the apparatus in opposite directions. In an illustrative embodiment, an equalizer comprising a planar glass Mach-Zehnder interferometer is fabricated on a chip having a waveguide in one of its arms and a cascaded grating-lens-grating in the other. Phase distortion is advantageously compensated by adjusting the arm lengths in the grating and lens as disclosed in the above-referenced related copending application to reduce loss and optical crosstalk among the spectral control points. Polarization dependencies exhibited by components of the interferometer are eliminated by splitting the incoming stream to be equalized into two orthogonally polarized streams which are applied to opposite ends of the equalizer chip through polarization maintaining fibers oriented such that the light polarization is the same on the chip for both directions and is aligned with one of the chip's eigenpolarizations. The light streams pass through the waveguide and through the cascaded grating-lens-grating in opposite directions and are recombined and applied to the opposite polarization maintaining fiber from which they entered the equalizer. The split streams are then spectrally re-combined and directed to the output. Advantageously, the incoming light stream entering one port of a circulator and emerging from a second port is applied to the splitter on its way to the equalizer while the light streams from the equalizer after being spectrally recombined re-enter the second port of the circulator and emerge from its third port to the output thereby eliminating any polarization dependencies of the interferometer.

BRIEF DESCRIPTION OF THE DRAWING

The foregoing and other features of the invention may become more apparent from a reading of ensuing description, together with the drawing, in which.

GENERAL DESCRIPTION

Figure 1:
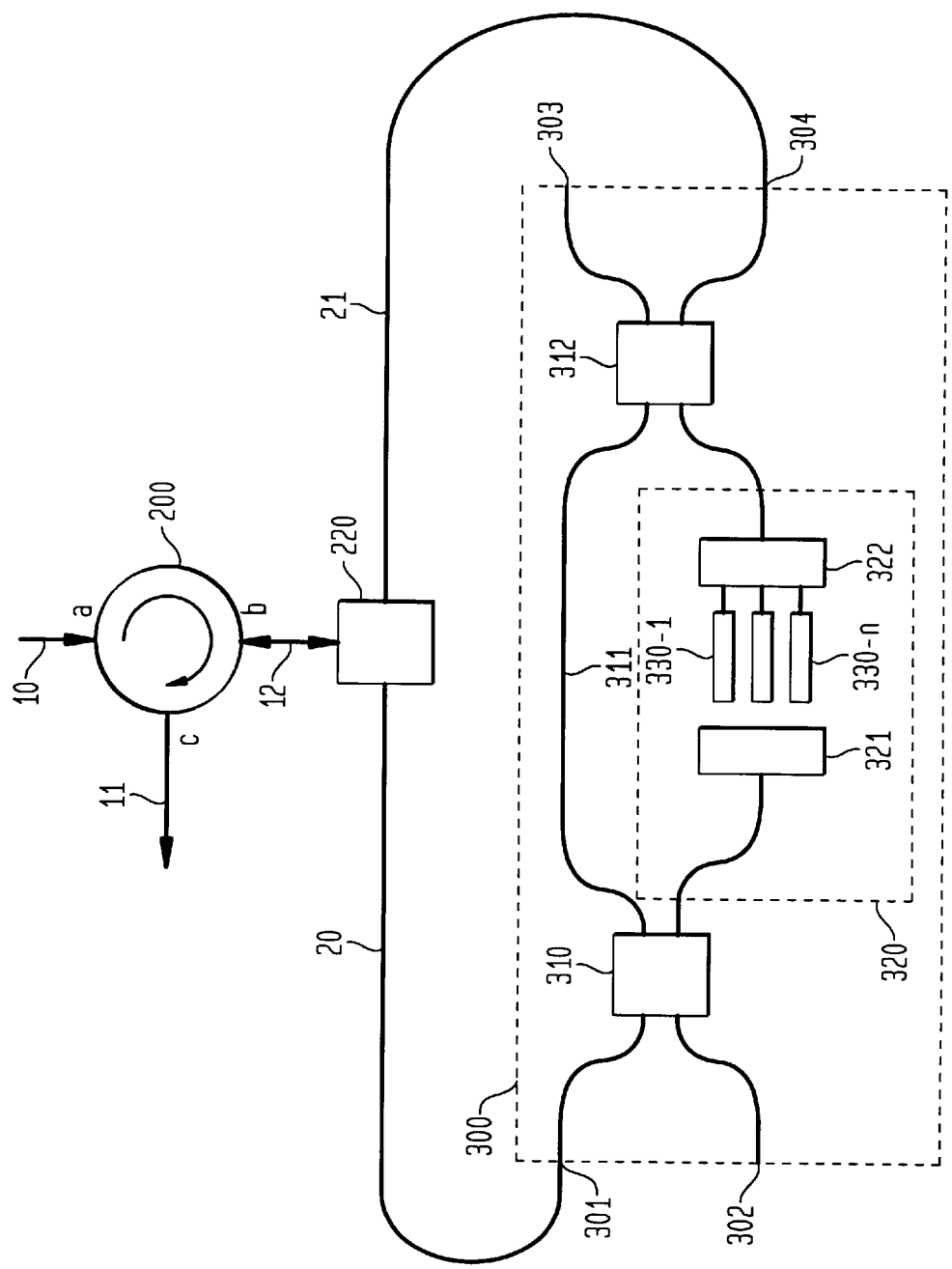
FIG. 1 shows a combination of a circulator and polarization splitter connected to a chip in accordance with the principles of the invention.

In an illustrative embodiment of the invention shown in FIG. 1, a Mach-Zehnder interferometer 300 comprising a waveguide 311 and a grating-lens-grating array 320 was fabricated on a glass chip having a pn/n of 0.65%, and a grating arm number of 30. The spacings between adjacent grating arm inlets (i.e., the center-to-center spacing between grating arms in a waveguide grating router—see the above-mentioned copending application entitled "Compensated Cascaded Waveguides"—at the star coupler interface) are quite narrow, illustratively 9.6 $\mu$m. Sampling at the connection points between multiplexer/de-multiplexer 321 and the phase shifter array 330-1 through 330-n, and likewise between multiplexer/de-multiplexer 312 and phase shifter array 330-1 through 330-n is advantageously performed at a frequency slightly greater than required by the Nyquist criteria, 31 samples are used per free-spectral range, center 23 taken. These physical features would, by themselves, give rise to more mutual coupling and consequently aberrations but, in accordance with the principles disclosed in the above-mentioned related application, a phase correction is applied to the grating and lens arms, the amplitude of the correction being calculated by simulated beam propagation in the waveguide arrays.

In FIG. 1 a polarization diversity scheme is employed to render the illustrative Mach-Zehnder interferometer insensitive to polarization effects in its components. A single mode fiber 10 applies the incoming lightwave to port "a" of circulator 200. A circulator is a three-port device that permits flow of light energy in one direction only so that light entering port "a" exits at sequentially adjacent port "b" and light entering port "b" exits at sequentially adjacent port "c".

Light exiting port "b" of circulator 200 is applied over single mode fiber 12 to polarization splitter 220. Splitter 220 produces orthogonally polarized light at its outputs L and R. Splitter 220 output L is connected to polarization-maintaining fiber 20 which is affixed to left-hand upper input 301 of planar glass chip 300. Splitter 220 output R is connected to polarization-maintaining fiber 21 which is affixed to the lower right-hand input of planar glass chip 300. Actually, one could attach fiber 20 to either of inputs 301 or 302, and likewise one could attach fiber 21 to either of inputs 303 or 304. The advantage of using one lower port and one upper port is that this configuration tends to cancel out polarization, wavelength, and fabrication dependencies of the couplers 310 and 312.

Fibers 20 and 21 are affixed to chip 300, illustratively by gluing, so that the light enters opposite ends of chip with the same orientation, is on the slow axis (or one could use the fast axis) each of the fibers and is aligned with one of the chip's eigenpolarizations (i.e., either perpendicular or parallel to the plane of the chip). In this way all the light in chip 300 has the same polarization, thereby eliminating all polarization-dependent effects on the chip, such as PDL and polarization mode dispersion.

Fiber 20 is connected to terminal 301 of coupler 310 which, illustratively, has a 50/50 splitting ratio, applying half the power of the (left-to-right traveling) lightwave entering at terminal 301 to waveguide 311 and half of the light power to grating-lens-grating structure 320. Coupler 310 is an evanescent coupler for illustrative purposes (it could be another type of optical coupler, such as a multimode interference coupler or a star coupler) which may exhibit polarization-dependency, the TM coupling ratio being 5% higher, typically, than the TE polarization. This dependence can be eliminated to first order, without choosing a different type coupler (an evanescent coupler having the lowest possible excess loss), by connecting fiber 20 to the upper port 301 of coupler 310 and by connecting fiber 21 to the lower port 304 of coupler 312. The coupling ratio of both couplers 310 and 312 must then be 50/50 for minimum loss.

Grating 321 separates (demultiplexes) the lightwave from coupler 310 into its constituent bands (channels) so that an array of phase shifters 330-1 through 330-n may apply specified phase shifts to each channel present in the lightwave. Advantageously, array 330 may employ thermooptic phase shifters.

At the same time, light from polarization maintaining fiber 21 is applied to terminal 304 of coupler 312 which applies half the power of the (right-to-left traveling) lightwave to waveguide 311 and half (or some other desired splitting ratio) to structure 320. Grating 322 demultiplexes the right-to-left traveling lightwave into its constituent bands so that phase shifter array 330-1 through 330-n may apply corresponding respective phase shifts to the respective channels.

The channels of phase-shifted left-to-right traveling light exiting array 330-1 through 330-n are remultiplexed in grating 322 and applied to coupler 312 which reassembles them together with the left-to-right traveling lightwave from waveguide 311 and applies the assembled light wave to fiber 21, which carries it to splitter 220.

The channels of phase-shifted right-to-left traveling light exiting array 330-1 through 330-n are remultiplexed in grating 321 and applied to coupler 310 which reassembles them together with the right-to-left traveling lightwave from waveguide 311 and applies the assembled light wave to fiber 20, which carries it to splitter 220.

Splitter 220 re-assembles the light entering its terminals a and b and applies the light output to circulator 200 port 2. Light entering circulator 200 port 2 exits at port 3. Because the split light streams pass through all of the components of the Mach-Zehnder interferometer in the same polarization, but opposite directions, any polarization dependencies introduced by any of the components is canceled by their being recombined.

Figure 2:
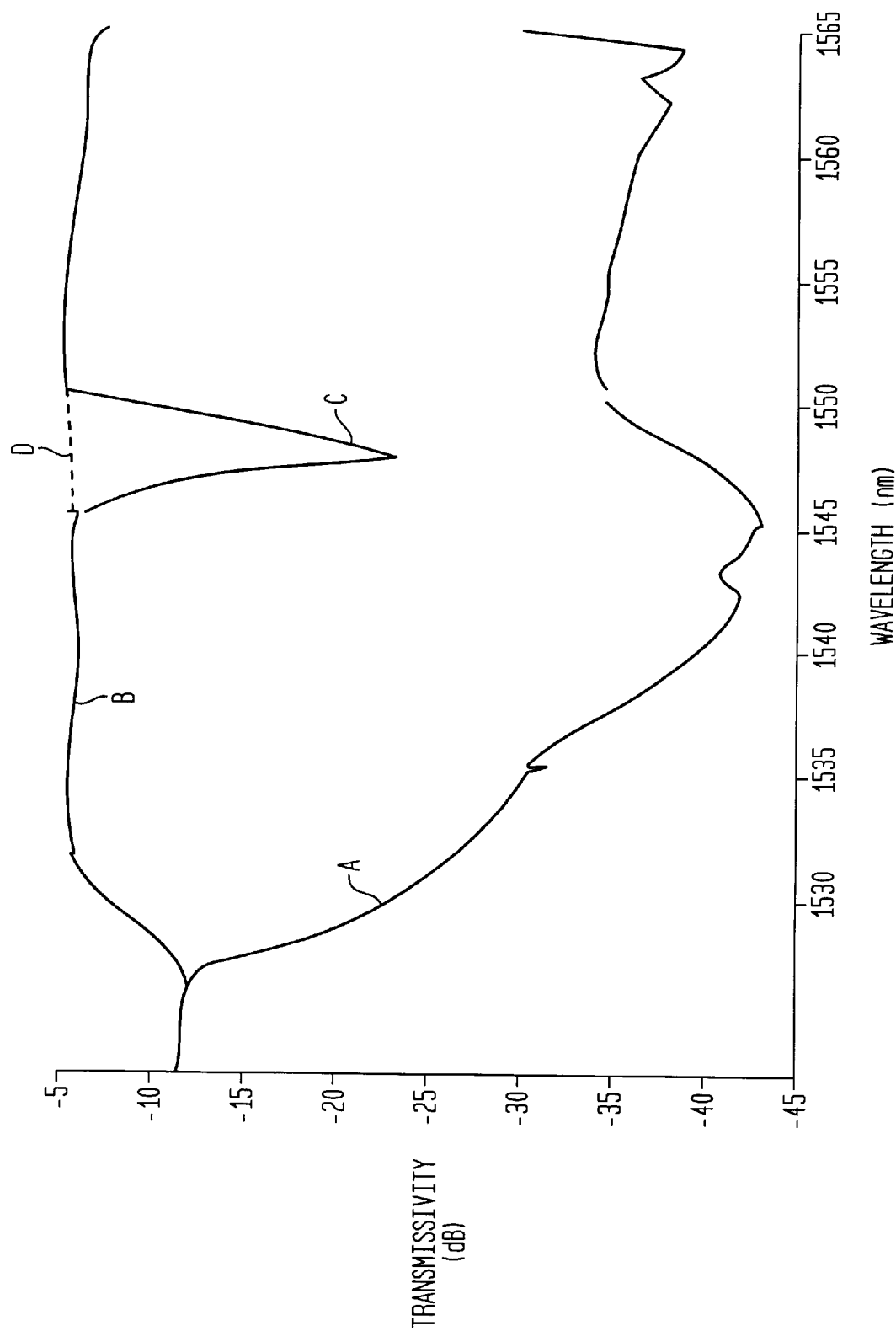
FIG. 2 is plot of measured results using a chip with a coupler ratio of 0.55 at the short-wavelength end of the spectrum increasing to 0.62 at the long-wavelength end.

FIG. 2 shows measured results of the transmissivity through the equalizer using the polarization diversity scheme. The top (trace B–D) and bottom (trace A) traces are with all of the phase shifters adjusted for minimum and maximum attenuation, respectively. The trace with the dip (trace B–C) is the same as the top trace except that one phase shifter was set for maximum attenuation without adjusting any other phase shifter voltage. The polarization dependence of the transmissivity is on the order of 0.1 dB.

In a previous design, the loss of the grating-lens-grating structure 320, normalized to the loss of the nonfiltered waveguide 311, was measured to be 7.5 dB for the center channels and 9.0 dB for the outer channels. In the present design, because of the increased mutual coupling and the phase corrections, as described above, the amounts are reduced to 3.7 dB and 5.1 dB, respectively. Also, the optical crosstalk between the spectral control points is lower, so that the equalized spectrum can be substantially flatter. Polarization-dependent loss (PDL) limits the usefulness of an equalizer, and for many applications the PDL must be <0.1 dB over the entire spectrum of interest. In some previous designs a worst-case PDL of more than 5 dB was observed caused by different birefringences between the non-filtered arm 311 and the filtered arms 320 even though the non-filtered and filtered arms had exactly the same length. Such different birefringences may arise because of different waveguide movements and cross-section shapes (one arm is a plain waveguide, and the other is a cascaded grating-lens-grating). In the present version, the sum of the bend lengths is made equal.

Figure 3:
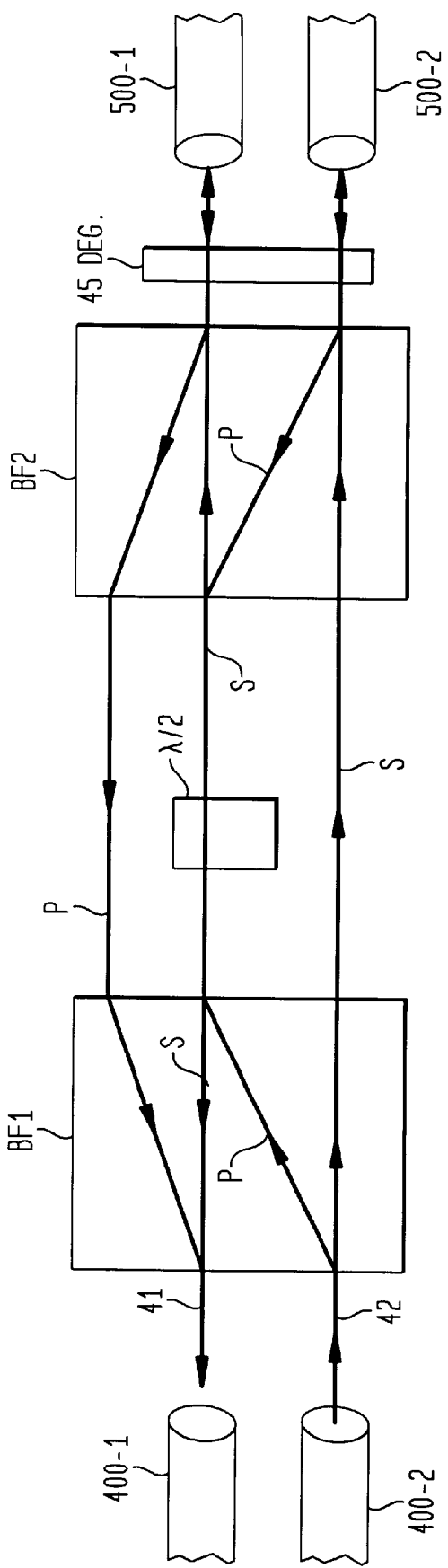
FIG. 3 shows alternative embodiment of the invention.

One could combine the circulator and polarization splitter into a single device. An example of such a device is shown in FIG. 3. It works as follows. Input light 42 comes from fiber 400-2 and is split into two orthogonal polarizations (s and p) by birefringent crystal BF1. The p polarization is rotated to become s polarization by the $\lambda/2$ plate. The s polarized light waves then pass through the second birefringent crystal BF2, are rotated 45 degrees by the Faraday rotator (marked 45 deg on the drawing). The rotated lightwaves then enter the PM fibers (500-1 and 500-2), each PM fiber having its axis at 45 degrees so that the light is on the same axis in each fiber. PM fibers 500-1 and 500-2 carry the lightwaves to the chromatically variable transmissivity device (not shown in FIG. 3). On return from the device, the lightwaves are on the same axes of the PM fibers as when they entered. The returning lightwaves exit fibers 500-1 and 500-2 and are rotated 45 degrees by the Faraday rotator, but in the opposite direction so that they are now p-polarized. They are both deflected upwards by birefringent crystal BF2, but one lightwave is rotated to s polarization by the $\lambda/2$ plate, and they are recombined into fiber 400-1.

The foregoing is illustrative of the principles of the invention. It should be apparent to those skilled in the art that instead of employing a single Mach-Zehnder interferometer, an equalizer may, with equally advantageous results, be fabricated using a series of Mach-Zehnder interferometers or, instead of using any MZIs, an equalizer may be constructed using waveguides having a multiplexer and a demultiplexer connected by an array of variable attenuators.

In either case, polarization dependency will be reduced by combining the equalizer with a circulator and a polarization splitter which applies identically polarized light beams to the equalizer through polarization maintaining fibers. It should also be apparent that the the interferometer may be made as a planar lightwave circuit; that the planar lightwave circuit may be made in glass; and that the circulator and polarization splitter may be combined in the same unit. Further and other modifications will be apparent to those skilled in the art and may be made without, however, departing from the spirit and scope of the invention.

What is claimed is:

1. A method of reducing the polarization dependency of an optical apparatus having chromatically variable transmissivity coupled to a light source, said apparatus including a waveguide arm and a cascaded grating-lens-grating arm, said lens including a plurality of phase shifters for applying a specified phase shift to each channel present in the light source, comprising splitting the light incoming to the apparatus into orthogonally polarized streams; and directing the streams to pass through the waveguide and cascaded grating-lens-grating arms in opposite directions.

2. A method according to claim 1 wherein said orthogonally polarized streams are applied to said apparatus through polarization-maintaining fibers so that the light is on the same axis in both fibers.

3. A method of reducing birefringence differences between the two arms of an interferometer having a waveguide in one arm and a cascaded filter in the other, comprising admitting a stream of input light first to a circulator and then to a polarization splitter connected to pass light through the arms of the interferometer in opposite directions.

4. A combined circulator and polarization splitter comprising:

a birefringent crystal for separating an incoming lightwave into two polarizations and for recombining two polarizations of returning lightwaves into an output lightwave;

a half-wave plate for rotating the polarization of lightwaves;

a second birefringent crystal for spatially separating said returning lightwaves;

a pair of polarization-maintaining fibers adapted to carry lightwaves to and from a chromatically variable transmissivity device; and a 45-degree Faraday rotator interposed between said second birefringent crystal and said pair of polarization maintaining fibers.

5. A combined circulator and polarization splitter according to claim 4 wherein said half-wave plate rotates the polarization of one of said separated incoming lightwaves and one of said separated returning lightwaves.

6. A combined circulator and polarization splitter according to claim 4 wherein an input and an output fiber is coupled to said first birefringent crystal, said input fiber carrying said incoming lightwave to be separated by said first crystal and said output fiber carrying said returning lightwave recombined by said first crystal.

7. A combined circulator and polarization splitter according to claim 4 wherein said Faraday rotator rotates polarized lightwaves emerging from said second birefringent crystal on the way to said polarization maintaining fibers and rotates in the opposite direction polarized lightwaves emerging from said polarization maintaining fibers on the way to said second birefringent crystal.

* * * * *